United States Patent [19]
Carpenter et al.

[11] 3,891,776
[45] June 24, 1975

[54] PROTEIN PRODUCT

[75] Inventors: Roland Paul Carpenter; William Pirie Cowie, both of Aberdeen, Scotland; Alan Heyes, Oakley, England; Anthony Hubert Sutton, Stonehaven, Scotland

[73] Assignee: Lever Brothers Company, New York, N.Y.

[22] Filed: Nov. 2, 1972

[21] Appl. No.: 303,177

[52] U.S. Cl. ............... 426/573; 426/276; 426/350
[51] Int. Cl. ............................................. A23j 3/00
[58] Field of Search ............ 426/169, 350, 276, 212

[56] References Cited
UNITED STATES PATENTS
3,060,032   10/1962   Glicksman ......................... 426/169
3,093,483   6/1963   Ishler et al. ..................... 426/276 X

*Primary Examiner*—James R. Hoffman
*Attorney, Agent, or Firm*—James J. Farrell, Esq.; Melvin H. Kurtz, Esq.; Arnold Grant, Esq.

[57] ABSTRACT

A protein food product comprises a protein ingredient, particularly fish, and a water-soluble cellulose ether intimately associated with a gel matrix of a polyvalent metal salt of alginic acid. Such a product can be made by forming a mixture of the protein and cellulose ingredients together with a matrix precursor and sufficient water to form a sol which is subsequently set to a gel with the appropriate matrix setting agent.

7 Claims, No Drawings

PROTEIN PRODUCT

The invention relates to protein-containing products for use in savoury or unsweetened foodstuffs. More particularly the invention relates to shaped freeze-thaw stable and thermostable alginate gel products containing a characterising protein ingredient.

Whereas the following description is mainly concerned with products where the protein ingredient is derived from fish as the characterising ingredient, it is to be understood that similar products can be prepared from crustacea, from the protein of other meats such as animal or poultry meat, or from milk or eggs, or from proteins of vegetable origins such as those derived from soyabean, groundnut or cereals.

It is possible to prepare a mixture of sodium alginate, water and a protein ingredient such as alkali-extracted fish, egg albumin, casein or cereal flour and extrude this mixture into a solution of calcium acetate and acetic acid to provide filaments which can, after washing, be used as such as a food or as a foodstuff ingredient, but we have found that these products, if subsequently frozen, are susceptible to syneresis on thawing and therefore are unsuitable for use in the frozen foods industry. Moreover, such products also exhibit undesirably high liquor losses on cooking. It is also possible to decrease or eliminate freeze-thaw syneresis of edible alginate gel systems by the incorporation of a substantial amount of a sugar, but such products are unsuitable for use in savoury foodstuffs because of excessive sweetness; they can of course be employed in sweet tasting foodstuffs such as desserts.

We have now discovered that it is possible to provide freeze-thaw stable gels containing a protein ingredient which are well suited for use in frozen foodstuffs of a savoury, unsweetened nature, for example meat and fish products.

According to the invention, there is provided a protein product comprising a protein ingredient and an edible water-soluble cellulose ether intimately associated with a gel matrix of a non-toxic polyvalent metal salt of alginic acid.

The protein ingredient, as we have stated, can be derived from any edible animal or vegetable material and, for reasons of economy, can most usefully be derived from protein sources which require refining before consumption and which would otherwise constitute protein-containing waste material destined for animal feeds, agricultural fertilisers or for other industries.

In the frozen fish industry, for example, it has long been recognised that there is considerable and unavoidable wastage of the fish proteins especially that which remains attached to the heads and frames or flesh of frozen fish which have been filleted. Of the substantial proportion of the fish which remains after fillets have been removed, much is inedible as such, but it can be used in the glue industry or for the manufacture of animal feedstuffs or fertilisers or other commodities of low commercial value. Much effort has been directed during recent years to the recovery and refining of "waste" fish protein to enable it to be used in the manufacture of human foodstuffs. By way of example, purified fish protein, otherwise known as fish flour or fish protein concentrate can now be obtained from fish waste by any of several methods which are summarised by Julius Brodie in his review of "Fish By-Proucts Technology" published by the A.V.I. Publishing Company Incorporated in 1965 at page 209.

It is to be understood that the fish protein ingredient (or, where appropriate, other protein ingredient) need not necessarily be purified or refined, provided that it is safe for consumption. For example, alternative sources of fish protein ingredient can consist of coarsely or finely comminuted fish muscle which has not been subjected to any protein extraction technique. Thus it is possible to use finely comminuted fish muscle having an average particle size of less than 2 mm, or it is alternatively possible to use coarsely comminuted fish muscle having an average particle size of greater than 2 mm. In the latter case, the protein ingredient can comprise a proportion of fish muscle fibres or fibre bundles of for example from 2 – 15 mm in length and from about 0.5 – 2mm in diameter; this fibrous tissue can be usefully employed in imparting a natural fibrous texture to the product of the invention, as well as providing the necessary fish character.

The edible cellulose ether is characterised by its properties of being non-toxic, soluble in water and, of having the ability to limit or prevent syneresis in the finished product which might otherwise result when it is thawed from the frozen state and subsequently cooked.

Suitable edible water-soluble cellulose ethers are alkyl, hydroxyalkyl and carboxyalkyl celluloses, the alkyl radicals containing from 1 – 3 carbon atoms. Specific examples of these cellulose ethers which we have found particularly suitable are sodium carboxymethyl cellulose, methyl cellulose, ethyl cellulose, and hydroxypropyl cellulose. Mixed ethers comprising more than one substituent in the same cellulose molecule are also suitable.

The matrix with which the protein ingredient and the edible cellulose ether are intimately associated is a polyvalent metal salt, preferably a calcium salt, of alginic acid. The matrix can be formed in situ, as will be described in more detail later, by contacting a mixture comprising the protein ingredient, the edible cellulose ether and a matrix precursor, which comprises a corresponding alkali metal or ammonium salt of alginic acid, with an aqueous solution of the non-toxic polyvalent metal salt such as calcium chloride, calcuim acetate or calcium lactate.

The protein product may also contain other additives such as edible salts, flavouring agents, colouring matter and texturising aids as desired.

The protein product of the invention can be prepared by first making a mixture of the protein ingredient, the edible cellulose ether, and the alkali metal or ammonium salt of alginic acid, sufficient water being added to provide a sol which can be set to a gel by contacting it with the polyvalent metal salt. The gelled protein products can have a uniform shape or form and this is conveniently achieved by extruding the sol into a setting bath containing a solution of the polyvalent metal salt. The sol is thereby converted to a gel of the required shape and form which may for example be in the form of filaments, fibres, hollow fibres, tubes, rods or strips.

In order to ensure that the extruded product assumes a uniform, homogeneous structure having a smooth texture, the filament or fibre diameter or tube wall thickness or strip thickness of the extruded element whatever its shape or form should preferably be not greater than 5 mm and most preferably not greater than 2 mm. The solution containing the polyvalent metal salt, normally at a concentration of 0.5 – 15% w/v, preferably about 5% w/v, is normally applied externally of the extruded element and is thereby brought by diffusion into rapid contact with the alginate.

The proportions of each of the ingredients used to prepare the mixture to provide the sol can be selected according to the nature of these ingredients and the texture of gel to be produced. By way of example, we have found that the proportion of the cellulose ether in the sol is usually from about 0.3 – 3.0%, preferably 0.5 – 1.5%, by weight; similarly, the alginate will usually form from 0.2 – 5%, preferably 0.4 – 3.0%, by weight of the sol. The balance will, apart from minor ingredients, usually consist of the protein ingredient and water. It is of course possible to prepare products according to the invention using proportions of ingredients which are outside these ranges.

According to a preferred embodiment of the invention for making a uniform homogeneous shaped, smooth textured product, we have found that a suitable mixture may be prepared from the following ingredients:

|  | parts by weight |
|---|---|
| fish protein concentrate powder | 8.0 |
| sodium alginate | 0.9 |
| methyl cellulose | 1.0 |

A suspension can then be prepared from this dry mixture by dispersing it in 60 parts weight of water.

The sol so produced can be extruded as filaments of up to 5 mm in diameter or ribbons up to 5 mm thick into a setting bath containing up to 15% w/v, preferably 0.5 – 5% w/v valcium chloride solution. The preferred maximum diameter or thickness for the production of a uniform textured product by this means is 1 mm.

A product having a softer texture can be obtained by using proportionally less alginate or by using proportionally more cellulose ether. The opposite effect can be created by decreasing the water content. Texture can be expressed in terms of toughness on the Aberdeen Texturometer; a value of 4.7 being considered the equivalent of cooked cod muscle. (The Aberdeen Texturometer is described in a paper by A H Sutton and G Main entitled "A Texturometer for Measuring Toughness of Cooked Fish" in "Laboratory Practice," March 1972, pp 185 – 188.)

A particular use of the invention according to the preferred embodiment described above is in the manufacture of fish portions such as fish fingers, fish steaks or fish pie filling which are intended to be stored in the frozen state until purchased or prepared for consumption. It has been found, for example, that up to 15% of cod muscle in these products can be replaced by 2.5 cm long alginate-fish fibres 0.5 mm in diameter, or alginate-fish flake cut from an extruded ribbon of gel 2 cm wide and 0.3 – 2 mm thick, without detracting substantially from the appearance, texture or flavour of these products.

In contrast to the homogensous product obtained for example by extruding a sol shaped to a small dimension as defined earlier in this specification, a similarly composed protein-containing product but having a heterogeneous structure and discontinuous texture consisting of boundaries of crisp or hardened tissue interspersed with softer tissue and resembling multicellular meat or fish structure can be obtained by extruding and setting the sol in the manner described earlier, except that the extruded elements have a thickness dimension or a diameter which is greater than 5 mm. The reason for the development of a heterogeneous structure is not fully understood but it is believed that calcium ions diffusing from the exterior of the sol do not migrate rapidly and uniformly through the extruded sol element, and hence the "setting" reaction which converts the sol to a gel is itself not uniform.

The larger dimensioned heterogeneous gelled structure has particular utility in the preparation of whole food products, for example reformed prawns where the protein ingredient can be comminuted prawn flesh, or comminuted fish of a different variety such as cod together with suitable added colouring and flavouring matter to simulate prawns.

The protein products of the invention can thus find particular utility as foodstuff extenders, or they can be used as such as analogue foodstuffs in their own right. They do not exhibit a significant degree of syneresis in products which are thawed from the frozen state and hence they are suitable for use in many types of foodstuffs where water retention on thawing, and, where appropriate, on cooking is desirable.

The invention is illustrated by the following Examples.

EXAMPLE 1

This Example illustrates the preparation of fibres from fish protein concentrate which are suitable for inclusion in fish fingers.

An aqueous paste comprising 8 g decolorised fish protein concentrate prepared from cod waste, 1.0 g sodium alginate, 0.9 g methyl cellulose and 60 ml water was prepared by mixing the ingredients by means of a mortar and pestle.

The paste was extruded into a 5% w/v aqueous solution of calcium chloride through a 0.5 mm diameter aperture to yield firm white fibres which could be aligned by collecting them on a rotating spool. The fibres were subsequently washed with tap water to remove residual calcium salts and surplus moisture was removed by draining and blotting.

The fibres were removed from the collecting spool, chopped into 0.5 cm lengths and incorporated at a level of 10% on a wet weight basis into a mix comprising sliced, filleted cod and sodium tripolyphosphate. A small quantity (0.06% on a wet weight basis) of calcium chloride was added to ensure that the fibres retained their structure in the mix.

The mix was subsequently shaped, frozen and battered to provide fish fingers. These products were shown to be organoleptically indistinguishable from normal fish fingers both when freshly prepared and after 7 months storage at −29°C.

EXAMPLE 2

This Example illustrates the preparation of flake from intact fish muscle suitable for inclusion in fish fingers.

High quality trimmings resulting from cod filleting operations were first deboned using a Bibun DMM 15 bone separator. A sample of the bone-free product was then passed through the Bibun a second time with the rotating drum now being covered by a 24 mesh nylon gauze. Connective tissue was successfully separated from muscle by this technique.

The bone-free, connective tissue-free fish muscle obtained from these operations was restructured with alginate using the following formulation:

|  | parts by weight |
|---|---|
| fish muscle fraction from Bibun | 1000 |
| sodium alginate | 4 |
| methyl cellulose | 10 |

The mixes were extruded into 5% w/v calcium chloride using a ribbon forming die measuring 0.56 inch × 0.04 inch, and the resulting ribbon was chopped into small flakes and used as a partial replacement for fish in fish fingers at levels of 10%, 20% and 40% by weight. Only small differences in texture and flavour were detected by a trained taste panel between these samples and a control containing no alginate flake replacement.

The soft texture of the samples which the taste panel observed may have been attributed to reversion of the alginate gel due to sodium ions from the fish and sodium tripolyphosphate which was also added. This reversion was prevented in later samples by addition to the fish fingers of 0.06% by weight of the wet fish finger of calcium chloride.

EXAMPLE 3

This Example illustrates the use of proteins other than fish protein in the preparation of alginate protein fibres.

8 g soya protein, 1.0 g sodium alginate, 0.9 g methyl cellulose and 60 ml water were mixed thoroughly to form a paste which was extruded into a 5% w/v aqueous solution of calcium chloride through a 0.5 mm diameter aperture to yield firm white fibres. The fibres were subsequently washed with tap water to remove residual calcium chloride and surplus moisture was removed by draining and blotting.

The fibres were chopped into 0.5 cm lengths and incorporated at a level of 10% on a wet weight basis into a mix comprising coarsely comminuted raw meat. The meaty mix was shaped into steaklets and frozen.

On cooking and tasting, the reformed meat steaks were shown to have a pleasant flavour and a fibrous texture somewhat similar to that associated with meat fibre bundles.

EXAMPLE 4

This Example illustrates the effect of including methyl cellulose and of varying the proportions of alginate in extruded fibres based on fish protein concentrate.

8 g fish protein concentrate powder was dispersed in 60 ml water along with a quantity of sodium alginate and of methyl cellulose as shown in the table below. The resulting pastes were extruded into 5% calcium chloride solution, in the form of 1 mm diameter fibres and the texture and freeze-thaw loss were determined, as also shown in the table.

| Alginate (g) | Methyl Cellulose (g) | Texture | Freeze-thaw Loss (%) |
|---|---|---|---|
| 0.5 | 1.0 | 2.77 | 7.7 |
| 0.9 | 1.0 | 4.37 | 8.9 |
| 0.9 | — | 9.83 | 27.6 |

It was noted that the freeze-thaw loss exhibited by the extruded product was considerably reduced by incorporation of methyl cellulose into the paste: an increase in alginate level increased the texture score.

EXAMPLE 5

This Example illustrates the effect of including sodium carboxymethyl cellulose in extruded fibres based on fish protein concentrate. The alginate level is also varied.

8 g fish protein concentrate powder was dispersed in 60 ml water along with a quantity of sodium alginate and of sodium carboxymethyl cellulose as shown in the table below. The resulting pastes were extruded into 5% calcium chloride solution, in the form of 1 mm diameter fibres, and the texture and freeze-thaw loss were determined as also shown in the table.

| Alginate (g) | Sodium Carboxymethyl Cellulose (g) | Texture | Freeze-thaw Loss (%) |
|---|---|---|---|
| 0.5 | 1.0 | 3.58 | 18.1 |
| 0.5 | 0.7 | 4.32 | 21.4 |
| 0.5 | 0.5 | 5.41 | 21.6 |
| 0.3 | 0.5 | 3.27 | 24.8 |
| 0.7 | 0.5 | 6.73 | 22.9 |
| 0.9 | — | 9.83 | 27.6 |

The above data demonstrate several important points:
i. Increasing the alginate level causes an increase in fibre texture score.
ii. Increasing the sodium carboxymethyl cellulose level results in a reduced fibre texture score.
iii. Increasing the level of sodium carboxymethyl cellulose causes slight reductions in freeze-thaw loss.

EXAMPLE 6

This Example illustrates the preparation of prawn analogues.

Skinned, frozen cod and frozen prawns were thawed out and minced using a Hobart mincer with a 5 mm plate for the prawns and a 10 mm plate followed by a 5 mm plate for the cod. Sodium alginate was meanwhile mixed with water and colouring matter, and methyl cellulose was then added together with the cod and prawns to provide a thoroughly homogeneous mixture.

The protein-containing paste so prepared had the following composition:

|  | weight % |
|---|---|
| Raw cod, minced | 22.4 |
| Cooked prawns, minced | 10.5 |
| Sodium alginate | 3.0 |
| Methyl cellulose | 0.5 |
| Colouring matter | 0.1 |
| Water | 63.5 |

The paste mixture was transferred to a piping bag with a ¼ inch fluted nozzle and extruded into a 4.0% w/v calcium lactate solution.

Prawn-like shapes were obtained by curling the extruded mix onto a spoon before dropping it into the lactate solution. The prawn analogues were allowed to stand for 3 hours in the lactate solution by which time they had gelled completely. They were then removed from the lactate solution, drained, placed on a perforated tray and sprinkled with salt and then steam blanched for 5 minutes. The prawn analogues were then allowed to cool and finally frozen in mayonnaise and stored at −5°F.

On tasting, the prawn analogues had a texture which was very similar to that of real prawns in that it appeared to have a multicellular structure. It was furthermore notable that there was very little fluid loss as a result of blanching and freezing.

What is claimed is:

1. A protein-containing food product suitable for use as an ingredient in savoury or unsweetened foodstuffs, which food product is in the form of a thermostable gel and consists essentially of:
   a. about 0.3 to 3.0% by weight of a cellulose ether selected from edible water-soluble alkyl, hydroxyalkyl and carboxyalkyl celluloses the alkyl radicals of which contain from 1 to 3 carbon atoms;
   b. about 0.2 to 5.0% by weight of a calcium salt of an edible alginic acid; and
   c. the balance comprising water and an edible protein ingredient selected from the group consisting of finely divided or chemically concentrated fish, meat, poultry and vegetable protein.

2. A protein-containing food product according to claim 1, wherein said cellulose ether comprises from 0.5 to 1.5% by weight of said food product.

3. A protein-containing food product according to claim 2, wherein said cellulose ether is selected from sodium carboxymethyl cellulose, methyl cellulose, ethyl cellulose and hydroxypropyl cellulose.

4. A protein-containing food product according to claim 3, wherein said edible protein ingredient is a fish protein.

5. A protein-containing food product according to claim 4, wherein said fish portein is in the form of a fish protein concentrate.

6. A process for the preparation of a protein-containing food product according to claim 1, in which process:
   a. said edible protein ingredient, said cellulose ether, a sodium alginate and water are admixed to form a sol, and
   b. said sol is contacted with an aqueous solution of a calcium salt, selected from calcium chloride, calcium acetate and calcium lactate, to form a gel.

7. A process according to claim 6, wherein said sol is contacted with said aqueous solution by extrusion thereinto to form a shaped gel element.

* * * * *